May 5, 1964 U. F. GIANOLA 3,132,327

MAGNETIC SHIFT REGISTER

Filed Aug. 18, 1959 2 Sheets-Sheet 1

INVENTOR
U. F. GIANOLA
BY
[illegible]
ATTORNEY

May 5, 1964 U. F. GIANOLA 3,132,327

MAGNETIC SHIFT REGISTER

Filed Aug. 18, 1959 2 Sheets-Sheet 2

INVENTOR
U. F. GIANOLA
BY
William H. Kamstra
ATTORNEY

United States Patent Office 3,132,327
Patented May 5, 1964

3,132,327
MAGNETIC SHIFT REGISTER

Umberto F. Gianola, Florham Park, N.J., assignor to Bell Telephone Laboratories, Incorporated, New York, N.Y., a corporation of New York Filed Aug. 18, 1959, Ser. No. 834,464
18 Claims. (Cl. 340—174)

This invention relates to electrical control circuits and particularly to shift registers or delay lines in which two-state magnetic elements are employed as temporary information storage cells.

Shift registers, or delay lines as they are frequently termed, in which conventional toroidal magnetic cores are employed as temporary information storage elements, are well known in the electrical information handling art. In such registers, an information bit is introduced in a first stage of a serial train of stages, each stage comprising one or more of the toroidal cores, and is shifted along successive stages of the register during alternating advance phases of operation. An information bit is temporarily stored between advance shifts in the toroidal core or cores of a stage of the register in the form of a particular condition of remanent magnetization and is shifted between temporary storage cores of the register via coupling circuits coupling adjacent cores of the stages. Each of the stages thus comprises individual discrete storage elements in which flux changes independent of flux changes in other and adjacent elements are effective to accomplish the introduction and transfer of information bits from stage to stage. As an information bit is shifted along the register, its character may be examined at any stage during a shift by coupling an output winding either on each of the cores or on a core of a stage at which an information bit is to be read. In addition to the foregoing parallel read-out, it is also known, and it is generally the practice, to provide an output winding on the last core of the serial train to make possible serial read-out when an information bit ultimately is shifted to the end of the register.

Although the application of the well-known toroidal magnetic cores to realize various and numerous information handling circuits has proven highly advantageous, it may be noted that in some respects problems peculiar to their use have also been introduced. Particularly is this true in connection with shift register circuits. Thus, owing to the serial construction of such register circuits, any break in the continuity of the register train may result in the complete failure in the transmission of an information sequence or in the transmission of spurious information signals. Further, because of the manner in which an information bit is introduced in a core storage element, or transferred therefrom, additional and expensive associated electrical circuit elements are generally necessitated. An information bit is transferred from a core in which it is stored by switching the magnetic remanent state of the core from one polarity to the other to induce an output voltage in an output winding coupled to the core. A coupling circuit including the output winding and an input winding of the transferee core, as a result, has a current caused therein which in turn switches or sets the magnetic state of the transferee core to that representative of the transferred information bit. Thus, each core storage element must be coupled to its preceding and succeeding element by windings and connecting wiring in order to achieve the required shift of information in a conventional register. Further, in order to insure only a unilateral propagation of information bits in the register at one time, diodes are generally required to isolate each stage of the register from its preceding stage. The necessity of providing coupling circuitry and, in many cases, isolating diodes, not only adds to the cost of the register but also constitutes a serious problem from the viewpoint of substantial power losses.

The employment of separate toroidal magnetic cores and the like to serve as individual information bit storage elements demands a high degree of uniformity in the characteristics of the cores selected for fabrication of a shift register circuit. Further, since each core must be individually handled in the fabrication process, the cores are subject to damage and defects which may not readily be detected until after the circuit has been completely wired. The aforementioned continuity required in shift register circuits thus imposes a rather rigorous burden on the selection of the cores and the care in handling them during fabrication.

It is an object of the present invention to provide a new and novel shift register circuit in which the propagation of information is accomplished entirely within the confines of a single integral magnetic structure.

It is also an object of this invention to provide a new and novel magnetic shift register circuit in which the propagation of information is accomplished between magnetic storage elements without the use of intermediate electrical coupling circuitry.

Another object of this invention is the unilateral propagation of information between the stages of a shift register circuit without the necessity of providing unilateral current conducting elements for this purpose.

A further object of this invention is the provision of a new and novel magnetic flux control structure advantageously adaptable as a switching device for use in shift register circuits, counters, stepping switches, and the like.

Yet another object of this invention is to accomplish the control of flux propagation in a magnetic structure in a new and novel manner.

A still further object of this invention is to provide a more economical and reliable shift register circuit which is at the same time more easily fabricated.

The foregoing and other objects of this invention are realized in one illustrative shift register embodiment thereof in which a magnetic structure of a material displaying substantially rectangular hysteresis characteristics comprises the basic temporary information storage and transfer element. The structure is conveniently in the form of a flat plate and has a plurality of apertures therein about which various specific flux controls are effected in the operation of the register. The apertures are located in the plate in two groups in a manner such that the first aperture in each group, in terms of the physical arrangement, is common to both, this common aperture being termed the input aperture. The last aperture of each group, also in terms of the physical arrangement, is also common to both groups and is designated the output aperture. This arrangement of the apertures is conveniently achieved by determining their centers in a substantially circular alignment with the result that the first and last common apertures of the two groups are disposed substantially diametrically opposite each other. The apertures are further located in the plate with respect to each other such that the minimum cross-sectional areas of flux legs formed by the magnetic material separating the apertures are maintained substantially equal.

Beginning with the aperture on either side of the input aperture, each aperture except the latter aperture has threaded therethrough an advance winding, which advance windings are alternately serially connected in a pair of advance circuits. In a simple serial-out form of the present invention, an input winding is threaded through the common input aperture and an output winding is threaded through the common output aperture. In an initial flux distribution in the plate structure thus far described, a remanent flux is present in each of the legs defined by the material separating the circularly disposed apertures of one group in a direction radially inward. A remanent flux is also present in each of the legs defined by the material separating the circularly disposed apertures of the other group in a direction radially outward. Flux closure of each of these fluxes through other portions of the plate structure may readily be traced on the basis of a number of consistent explanations, each of which may be understood as satisfactorily describing the novel operation of this invention. It will be convenient here to assume the linking of the flux from the legs of one group of apertures to the flux in the legs of the other group in view of the polarities described. The information bits to be shifted through the register are each individually stored in the discrete legs of the structure formed by the apertures. Corresponding legs formed by each group of apertures thus comprise a plurality of pairs of storage elements and an information bit is simultaneously stored in each element of a pair of elements so presented. Thus, in keeping with the two-phase advance cycle mentioned hereinbefore, each "stage" of a shift register according to this invention comprises four legs: two pairs of corresponding legs formed by the two groups of apertures.

The input current pulses and the advance current pulses applied to the windings during the operation of this invention are limited in magnitude with respect to the number of turns of the windings such that only a limited magnetomotive force is developed thereby. A magnetomotive force is required in each operation just sufficient to cause a reversal of flux in the pair of legs on each side of a single aperture through which an energizing winding is threaded. An information bit is introduced into the register in the form of an input current pulse applied via the input winding threading the first, common aperture of the two groups. A reversal of flux on each side of that aperture results to represent the information bit introduced. An alternating sequence of advance current pulses applied to the two-phase advance circuits is then effective to switch successively the flux in succeeding pairs of legs of the two groups simultaneously to accomplish the propagation of the information bit from the input end to the output end of the register. Upon the last of the applied advance current pulses, the flux in the legs enclosing the common, output aperture is restored to the magnetic state initially assumed. An output signal representative of the information bit is thus induced in the threaded output winding to provide a serial read-out.

In the manner of operation of conventional, known shift registers, if no information bits have been introduced into the register of this invention, or, with the same result, the introduced information bits are such as to cause no reversal of flux in the plate structure, the advance current pulses will cause no shifts of a reversing flux since in each leg of the pairs of legs the flux is already in the direction to which the advance magnetomotive forces attempt to drive them.

It is accordingly a feature of this invention that the storage elements providing for temporary storage of information between shifts are arranged in pairs with corresponding transfers to and shifts from the elements of each pair taking place simultaneously. In accordance with known practice in other applications of magnetic switching principles, an output winding may be coupled to a leg or to each leg of either group of legs or of both groups of legs, or to selected legs of the two groups of legs in particular combinations. A wide flexibility in possible output combinations is thus advantageously made available by a shift register according to this invention.

As generally described in the foregoing, it is thus another feature of this invention that all of the switching operations and information storage functions are performed in connection with a single unitary magnetic structure. A simple, easily fabricated flat plate is readily apertured to provide the basic switching structure to perform all of the control operations which hitherto have been performed by numbers of separate and discrete magnetic elements.

It is another feature of this invention that the flat plate magnetic structure readily lends itself to specific profiling in order further to enhance the positive control of the flux switching during the advance phases of operation. Thus in another specific embodiment of this invention portions of the plate structure are removed in order further to define the flux paths about the circularly disposed apertures within which the closure of switching flux is to be controlled. Wider margins in the magnitude of the limited advance current pulses may thus be tolerated. A related circuit arrangement achieving similar advantages but operating in a different manner is described in the copending application of T. H. Crowley and U. F. Gianola, Serial No. 834,587, filed Aug. 18, 1959.

The foregoing and other objects and features of this invention will be better apprehended from a consideration of the detailed description of illustrative embodiments thereof which follows when taken in conjunction with the accompanying drawing in which.

Figure 1:
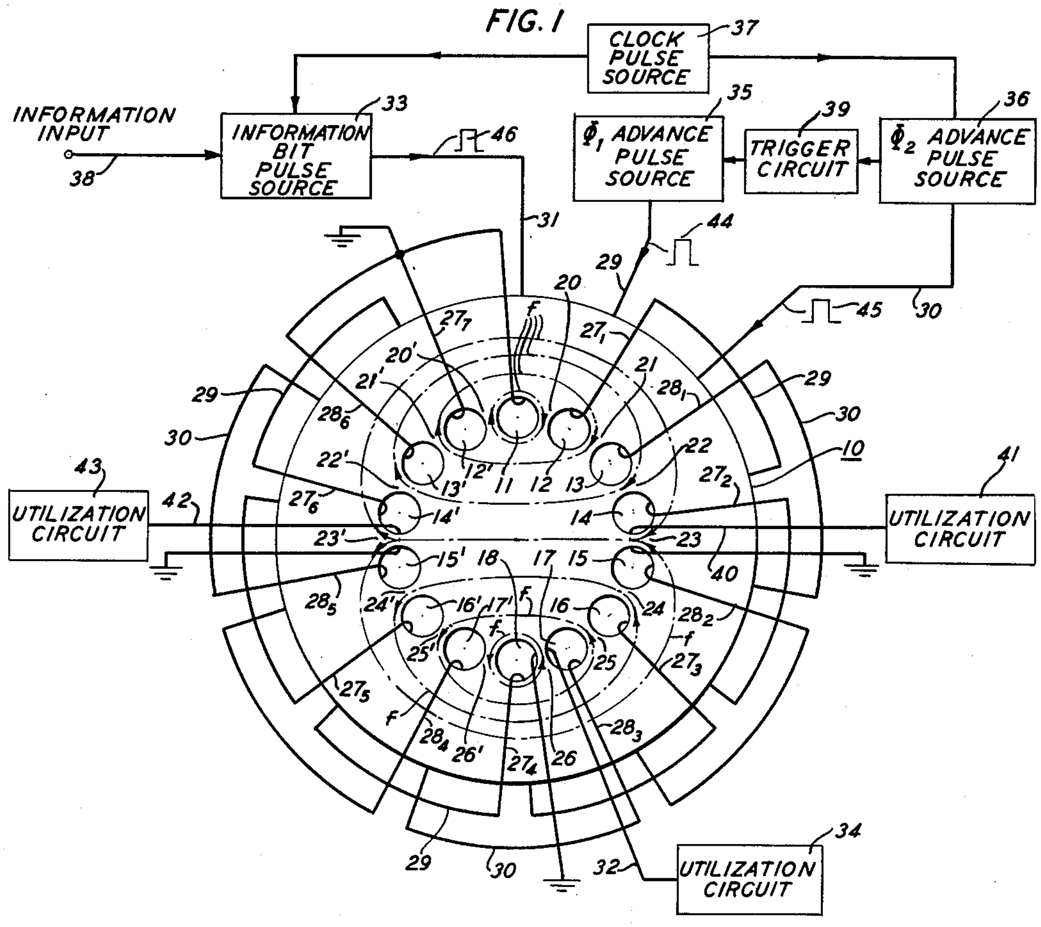
FIG. 1 is a schematic presentation of one specific illustrative embodiment according to the principles of this invention.

Turning now to FIG. 1 of the drawing, a detailed description of the illustrative shift register circuit of this invention there shown may now be provided. The basic magnetic switching element of the shift register circuit comprises a circular magnetic plate 10. The plate 10 is formed of any of the well-known ferrite materials displaying substantially rectangular hysteresis characteristics and is shown circular in outline merely for convenience and symmetry. As will appear hereinafter, other and more specific configurations will be equally suitable in the practice of this invention. A plurality of apertures, each shown circular in shape to permit ready fabrication, are arranged in the plate in two groups, the first and the last aperture of each group being common to both groups. Thus, the apertures 11, 12, 13, 14, 15, 16, 17, and 18 comprise the apertures of one group and the apertures 11, 12′, 13′, 14′, 15′, 16′, 17′, and 18 comprise the apertures of the other group. The division of the apertures into two groups, each group of which shares the common apertures 11 and 18, is conveniently, but not necessarily, accomplished by arranging all of the apertures substantially circularly to accord with the circular configuration of the plate structure 10. The apertures 11, 12, 13, et cetera, define therebetween a plurality of separating legs 20 through 26 and 20′ through 26′, also divided respectively into two groups.

Each possible magnetic flux path in the structure 10 defined by the apertures recited has a portion thereof which is flux limited to a particular flux value. This condition is achieved in the embodiment of FIG. 1 by maintaining the minimum cross-sectional areas of the legs 20 through 26 and 20' through 26' substantially equal. The other portions of the structure 10 need then be dimensioned only sufficiently large to provide a closure route or routes for the sum of the fluxes appearing in the legs described. The various manners in which the latter dimensions may be adjusted will become more apparent hereinafter in connection with the description of an illustrative operation of this invention. Threaded through each of the apertures 12, 14, 16, and 18 and apertures 12', 14', and 16', and therefore inductively coupled to the adjacent portions of the plate structure 10, is an advance winding 27 energized in an advance phase of operation $\Phi_1$. An advance winding 28 is similarly threaded through each of the apertures 13, 15, and 17 and apertures 13', 15', and 17', which windings 28 are energized in an advance phase of operation $\Phi_2$. The advance windings 27 and 28 are alternately serially connected in $\Phi_1$ and $\Phi_2$ advance circuits 29 and 30, respectively. Thus, advance windings $27_1$ through $27_7$ are serially connected in a clockwise direction about the circularly disposed apertures, as viewed in FIG. 1, in the $\Phi_1$ advance circuit 29. The advance windings $28_1$ through $28_6$ are serially connected in the $\Phi_2$ advance circuit 30, also in a clockwise direction as viewed in FIG. 1. An information input winding 31 is threaded through the common first aperture 11 of the two groups of apertures, and an output winding 32 is threaded through the common last aperture 18 of the two groups of apertures.

Each of the advance circuits 29 and 30, as well as the input winding 31 and output winding 32, is connected at one terminus to ground. The input winding 31 is connected at its other terminus to an information bit pulse source 33. The output winding 32 is connected at its other terminus to a utilization circuit 34. Each of the advance circuits 29 and 30 is connected at its other terminus to an advance pulse source. Specifically, the advance circuit 29 is connected to the $\Phi_1$ advance pulse source 35 and the advance circuit 30 is connected to the $\Phi_2$ advance pulse source 36. Each of the sources 35 and 36 may comprise current pulse generators of a character known to one skilled in the art capable of generating pulses of a polarity and relative magnitude to be described hereinafter. The pulse source 33 may also comprise typical, well-known circuitry for generating an input pulse at the times required. The utilization circuit 34 may comprise any associated load means in the system of which the shift register of FIG. 1 may be adapted for use. The sources 33, 35, and 36 and the utilization circuit 34 are referred to herein only in general terms since they comprise known elements of the novel combination according to this invention and accordingly need not be more specifically described.

Timing control of the energizing information source 33 and the advance pulse sources 35 and 36 may be accomplished in any manner as may be dictated by the context in which the register circuit of FIG. 1 is operated. One exemplary control arrangement which may be employed to provide input and advance phase coordination is depicted in FIG. 1. A clock pulse source 37 provides periodic timing pulses which simultaneously control the energization of the $\Phi_2$ advance pulse source 36 and the information bit pulse source 33. Thus, as will be better understood from a description of the operation of the present embodiment which follows, an information bit in the form either of an input current pulse representative of one binary value or the absence of such a pulse for the other binary value may be introduced simultaneously with a shift of information by the $\Phi_2$ advance pulse. The information bit pulse source 33 may be further controlled to generate a current pulse representative of a particular binary value by applying desired information signals to the input terminal 38. An output of the $\Phi_2$ advance pulse source 36 may also be used to time the energization of the subsequent alternate $\Phi_1$ advance pulse source 35. This function may be accomplished by interposing a suitable trigger circuit 39, which latter circuit may in turn time the $\Phi_1$ advance phase to occur between the periodic clock pulses generated by the clock pulse source 37.

In keeping with one of the features of this invention, a parallel output winding 40, coupled to the leg 23, is connected between ground and a utilization circuit 41. A second parallel output winding 42, coupled to the leg 23', is also connected between ground and a second utilization circuit 43. The parallel output windings 40 and 42 are to be understood as being representative of parallel output windings which may be coupled to each of the legs 20 through 26 and 20' through 26' in accordance with a wide range of applications with which the present invention may be adapted for use. The utilization circuits 41 and 43 may thus comprise any load means having interest in the character of an information bit temporarily stored in a stage of the shift register. As will appear more explicitly hereinafter, the parallel output windings 40 and 42 are simultaneously energized consistent with the dual character of the shift register of this invention. In a similar manner a multiple serial output may be obtained by adding a serial output winding to the leg 26'. It will thus be appreciated that various and numerous output combinations are possible with the present dual register and that the ones explicitly shown and described are merely representative of such combinations and are therefore not limiting of the scope of this invention.

In view of the foregoing organization and structure, an illustrative operation of this invention may now be described. For this purpose, an initial flux distribution in the plate structure 10 will be assumed as indicated by the direction of the arrows in the legs 20 through 26 and 20' through 26'. The former legs are polarized inwardly from the periphery of the structure 10 toward its center and the latter legs are polarized outwardly from the center of the structure 10. Flux closure may be further assumed to be along the paths represented by the broken lines *f*. Other valid flux closure paths of the flux distribution described may be assumed without in any manner affecting the operation and practice of this invention. Thus, for example, all of the flux closure paths could as well have been assumed to close through the top sector of the circular plate 10. Whatever closure of flux is postulated, however, it is done bearing in mind the relative physical dimensions of the structure 10 and the flux control legs in view of the flux-limited nature of this invention to insure closure paths of sufficient flux capacity.

The first mode of operation which may be described is one in which the shift register remains "clear," that is, the mode in which no information bits have been or are being introduced into the register. In this connection and in keeping with conventional practice, a clear "magnetic" condition in a stage will be held to accord with the magnetic condition representative of a binary "0." Thus, in any consecutive train of information bits no change or "set" in the magnetic condition of a stage will be effected where a "0" occurs. Under the magnetic conditions of the legs assumed above, it will be apparent from an inspection of FIG. 1, bearing in mind the sense of the advance windings pictured, that, when a positive advance current pulse 44 is applied simultaneously to the advance windings $27_1$ through $27_7$ in the $\Phi_1$ advance phase, no directional change will occur in the flux in the legs 20 through 26 and 20' through 26'. The magnitude of the current pulse 44 is limited with respect to the number of turns of an advance winding 27 such that the magnetomotive force developed thereby is sufficient only to cause a flux reversal about a single aperture at a time. Although the magnetomotive forces developed are in a direction to switch the flux in each of the legs 21, 23, 25, 25′, 23′, and 21′, the only paths available for switching flux closure are already remanently saturated in the switching direction. Accordingly, only a "shuttle" flux excursion is caused during the $\Phi_1$ advance phase. In a succeeding $\Phi_2$ advance phase a similar situation exists. A positive, similarly limited, advance current pulse 45 generates magnetomotive forces in the advance windings $28_1$ through $28_6$ in a direction to reverse the remanent flux in each of the legs 22, 24, 26, 26′, 24′, and 22′. However, here again closure paths are denied to any switching flux, with only a consequent "shuttle" of flux in the saturated legs. Only negligible or noise output signals are thus produced in the output windings 32, 40, and 42 when no information is contained in the shift register. Obviously, the same result obtains should the register contain only binary "0's." Accordingly, binary "1's" comprise the significant information values, and it is only when the latter values are processed in the shift register of FIG. 1 that any essential change is brought about in the magnetic flux distribution of the plate structure 10.

Figure 2:
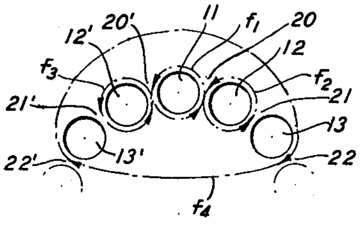
FIG. 2 is a partial view of the apertures of FIG. 1 depicting flux changes thereabout during a representative shift of an information bit during two advance phases.

The introduction into the shift register of this invention of the significant information value "1" is accomplished by an instruction of this value to the information bit pulse source 33 via the input terminal 38. Such an instruction takes the form of a trigger signal applied to the latter terminal from external control circuits, not shown. At the occurrence of a periodic clock pulse from the clock pulse source 37, the information bit pulse source 33 is caused to generate a positive input current pulse 46 of a magnitude just sufficient to cause a complete flux reversal about only one of the apertures of the structure 10 of FIG. 1. As will appear from an inspection of FIG. 1, the sense of the input winding 31 is such that a magnetomotive force is developed thereby opposing the flux presently remanent about the common aperture 11 of the two groups of apertures. A flux reversal as a result is caused in each of the legs 20 and 20′, leaving the remainder of the flux distribution undisturbed. The resulting magnetic state is depicted in FIG. 2 by the broken line $f_1$. By reversing or setting the flux in the legs 20 and 20′, a binary "1" is thus simultaneously introduced into both sections of the dual register. At the same time that the information bit pulse source 33 is energized by the information input signal and a periodic clock pulse, the $\Phi_2$ advance pulse source 36 is also triggered by a periodic clock pulse from the source 37. However, as previously pointed out, no change can occur at this time anywhere in the structure 10 as the result of the applied $\Phi_2$ limited advance current pulse 45 in view of the unavailability of flux closure paths for induced switching fluxes. The binary "1" may now be thought of in accordance with conventional shift register concepts as being contained in the "storage" element of a two-element-per-bit stage. The next step accordingly is its shift to the adjacent "transfer" element of the stage.

This shift is accomplished by the application of a $\Phi_1$ advance current pulse 44 to the $\Phi_1$ advance circuit 29. The energization of the $\Phi_1$ advance pulse source 35 and the timing of the advance pulse 44 are controlled by the trigger circuit 39 which is in turn responsive to a $\Phi_2$ advance pulse 45, as previously described. Because of the current pulse 44 limitation also previously described, the magnetomotive forces developed thereby are sufficient to switch flux about only single apertures. At this time flux closure paths are readily found to switch the flux in the legs 21 and 21′ to which the $\Phi_1$ advance windings $27_1$ and $27_7$, respectively, are coupled. Thus, referring to FIG. 2, it is clear that the switching flux represented by the broken line $f_2$ induced during $\Phi_1$ advance phase may find closure through the leg 20 by switching or resetting the "1" representative flux in the latter leg. Similarly, the switching flux represented by the broken line $f_3$ also induced during the $\Phi_1$ advance phase may find closure through the leg 20′ also by switching or resetting the "1" representative flux in that leg. Since flux closure paths are now understood for the flux in the legs 20 and 20′ other than about the common aperture 11, the flux line $f_1$ is obviously now superfluous. It may again here be pointed out that the flux closures assumed to facilitate a description of this invention are wholly arbitrary and have been selected for convenience only. The relevant and important factor here is the direction of the flux between the apertures rather than the theoretic closure of this flux. The actual physical behavior of the magnetic domains within the structure 10 is considerably more complex and a discussion of the specific behavior is outside the scope of this invention.

As a result of the $\Phi_1$ advance phase, the legs 20 and 20′ have been restored to their original or "clear" magnetic states and the "set" magnetic state representative of the binary "1" has been shifted to the next succeeding or "transfer" legs 21 and 21′. The next advance pulse to be applied will be the limited advance pulse 45 during the $\Phi_2$ advance phase. When the limited advance current pulse 45 is applied to each of the advance windings 27, the magnetomotive forces developed thereby can now cause flux reversals about the aperture 13 separating the legs 21 and 22 and the aperture 13′ separating the legs 21′ and 22′. Closure paths for a reversal of flux in the legs 22 and 22′ are now made available as the flux in each of the legs 21 and 21′ is restored to its initial polarity. The latter flux closures are not specifically demonstrated in FIG. 2; however, these may be similarly explained in terms of a reversal about the apertures 13 and 13′ of the flux presently represented by the broken line $f_4$. Thus, as a result of the $\Phi_2$ advance phase, the legs 21 and 21′ have been restored to their "clear" states and the "set" magnetic state representative of a binary "1" has been simultaneously shifted to the "storage" elements 22 and 22′ of the next succeeding "stage." During the $\Phi_2$ advance phase, due to the concurrent control effected by the clock pulse source 37, a second binary "1" or a "0" may be inserted in the legs 20 and 20′. Assuming the next information bit to be introduced to be a "0," the information bit pulse source 33 will not be energized with the result that the flux direction in the legs 20 and 20′ will remain unchanged from that indicated in FIG. 1. Upon the next and succeeding alternating $\Phi_1$ and $\Phi_2$ advance current pulses applied to the advance circutis 29 and 30, respectively, assuming the initial binary "1" to be the only "1" contained and introduced in the register, the latter bit will be shifted to the last legs 26 and 26′ of the register. The flux reversals and closures in the succeeding shifts may be understood as being accomplished in a manner substantially similar to that described in connection with the flux closures of the first $\Phi_1$ and $\Phi_2$ advance phases. When the flux in the leg 26 is set by the introduction therein of the "1," the flux change induces a signal of one polarity in the serial output winding 32. The immediately following $\Phi_1$ advance phase restores the flux in the output legs 26 and 26′ to the directions indicated in FIG. 1 with a consequent signal of the opposite polarity being induced in the serial output winding 32. Signals of either polarity are thus made available as an information bit "1" is shifted out of the register to the utilization circuit 34. Obviously, by coupling another serial output winding to the corresponding output leg 26′, simultaneous output signals could also be obtained as a result of flux changes in that leg.

As a "1" information bit is successively shifted in a clockwise direction as viewed in FIG. 1 along the legs 20 through 26 and simultaneously counterclockwise along the legs 20′ through 26′, the consequent flux changes in these legs may be employed to induce parallel output signals in parallel output windings coupled thereto. Such, for example, is the operation of the parallel output windings 40 and 42. As the flux in the legs 23 and 23′ is simultaneously switched during the transfer therefrom during a $\Phi_1$ advance phase, output signals are induced in the parallel output windings 40 and 42 and made available, respectively, to the utilization circuits 41 and 43. The manner and occasions in which such parallel output signals may be employed in system applications may readily be envisioned by one skilled in the art.

The simultaneous clockwise and counterclockwise propagation of the binary "1" along both sections of the shift register advantageously results in a self-clearing operation when the information bit reaches the last legs 26 and 26'. At this point both of these legs are restored to their initial magnetic flux condition when a binary "1" is shifted out. Assuming no further binary "1's" were introduced into the register other than the one originally inserted, the flux in each of the legs 20 through 26 and 20' through 26' will be restored to the direction initially assumed and indicated by the arrows in FIG. 1. Consistently with the flux closures and redistribution selected for convenience and partially depicted in FIG. 2, the flux closures after a complete traversal of the dual sections of the register may again be understood to coincide with those traced in FIG. 1. However, the direction of the flux in each of the legs is here the important consideration; as long as sufficient flux closure paths are provided, the precise nature of the closure paths is irrelevant to the operation of this invention.

Figure 3:
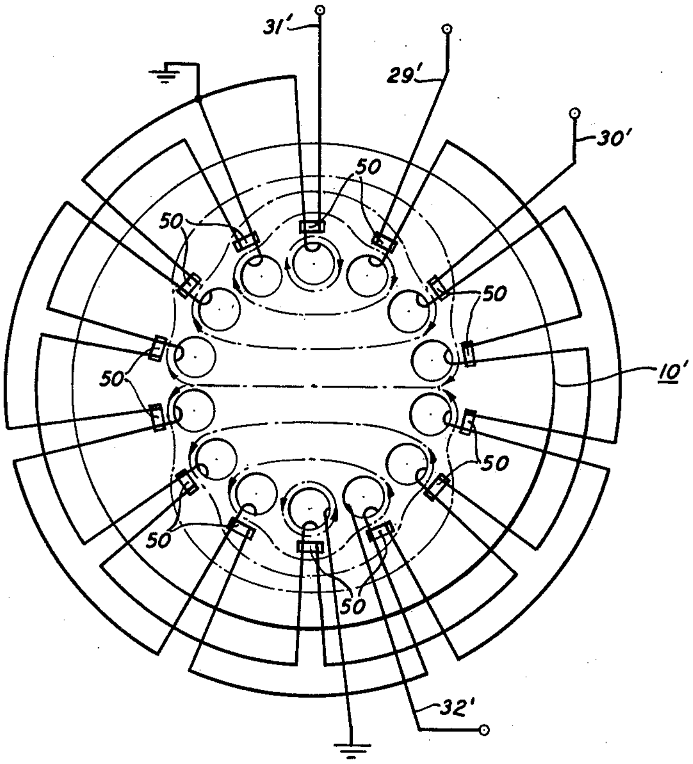
FIG. 3 shows a modification of the magnetic switching structure of FIG. 1 to define more positively particular flux control paths.

In FIG. 3 is shown an alternate plate structure 10' which may be employed as a substitute for the plate structure 10 of the shift register of FIG. 1. In addition to the main switching apertures already described in connection with the plate structure 10 of FIG. 1, the structure 10' has a plurality of auxiliary apertures 50 disposed radially outward from the two groups of previously described switching apertures. The portion of the structure 10' separating a switching aperture from an auxiliary aperture 50 is maintained substantially equal in minimum cross-sectional areas to the minimum cross-sectional areas of the plate portion separating the circularly disposed main switching apertures. A further flux-limited path is thus defined for the flux in each of the legs formed by the main switching apertures. By additionally threading each of the advance windings and input and output windings through an aperture 50 to enter and emerge from the same side of the plate structure 10' as depicted in FIG. 3, more positive control of the flux and the drives may advantageously be obtained. The operation of an illustrative shift register according this invention in which the modified plate structure 10' of FIG. 3 is employed is identical to that described for the embodiment of FIG. 1. A working initial flux distribution is again assumed as shown with the flux in the legs of the register taking the directions indicated by the arrows. An information representative drive signal is applied to the terminal of the input winding 31' to introduce the information bit into the register. Propagation of an information bit is again accomplished by applying alternating limited positive advance current pulses to the terminals of advance circuits 29' and 30'. Outputs may again be taken as represented by the serial output winding 32' in the same manner and to the same extent as was described for the embodiment of FIG. 1.

In addition to the provision of the additional flux-defining apertures 50 shown in FIG. 3, the periphery of the plate structures 10 and 10' may be profiled to restrict further the possible excursion of flux during a switching operation. Such an arrangement is not shown in the drawing but will readily occur to one skilled in the art desirous of attaining higher degrees of flux limitation.

It will be appreciated that, although fourteen apertures 20 through 26 and 20' through 26' are employed in the illustrative embodiments of FIGS. 1 and 3, any even number of apertures may be provided to form the flux-switching legs. The principles of this invention are further to be understood as including within their scope plate structures of other geometries and apertures of other alignments than the ones specifically shown and described. Further, specific modifications may be made within the scope of this invention to achieve similar, related sequential circuit arrangements. Thus, for example, by providing parallel output windings for each of one group of the legs of a structure 10 and arranging the input to operate responsive to a serial output signal, a reentrant stepping switch may be realized. By recirculating a binary "1" in such a circuit, an output signal may be caused to occur sequentially on the parallel output windings.

Accordingly, the embodiments which have been described are considered to be illustrative only, and it is to be understood that various and numerous other arrangements and adaptations may be devised by one skilled in the art without departing from the spirit and scope of this invention.

What is claimed is:

1. An electrical control circuit comprising a magnetic plate of a material having substantially rectangular hysteresis characteristics, said plate having a first and a second sequence of apertures therein to define a first and a second group of flux legs, said first and second sequence of apertures sharing a common first and a common last aperture, an input winding threading said common first aperture, a plurality of advance windings threading respectively all of the other apertures of said first and second sequence of apertures, a first advance circuit means including alternating first ones of said plurality of advance windings, a second advance circuit means including alternating second ones of said plurality of advance windings, and an output winding threading said common last aperture.

2. An electrical control circuit as claimed in claim 1 also comprising output windings threading at least a particular one other of said first and said second sequence of apertures.

3. An electrical circuit as claimed in claim 1 in which said first and said second sequence of apertures are arranged substantially in a single circle and said first and said second advance circuit means serially connect said advance windings continually in one direction about said circle.

4. An electrical circuit as claimed in claim 3 in which the legs of said first and said second group of flux legs have substantially equal minimum cross-sectional areas and at least the sum of the cross-sectional areas of other portions of said plate is at least equal to the sum of the cross-sectional areas of said flux legs.

5. A shift register circuit comprising a magnetic plate having substantially rectangular hysteresis characteristics, said plate having a plurality of apertures therein defining a first and a second sequence of flux legs therebetween, an input winding inductively coupled to the first leg of both said first and said second sequence of flux legs, a plurality of advance windings inductively coupled respectively to said first and said second sequence of flux legs, a first and a second advance circuit means for serially connecting alternating first and second ones of said plurality of advance windings in one direction along said first sequence of flux legs and in the opposite direction along said second sequence of flux legs, and output windings inductively coupled to particular ones of said first and said second sequence of flux legs.

6. A shift register circuit comprising a magnetic plate having substantially rectangular hysteresis characteristics, said plate having a plurality of apertures therein defining a first and a second sequence of corresponding flux legs therebetween, an input winding inductively coupled to the first legs of said first and said second sequence of flux legs, means including an input pulse source for applying a current pulse to said input winding to induce a particular magnetization in said first legs representative of an information bit, a plurality of advance windings inductively coupled respectively to said first and said second sequence of flux legs, and means for shifting said particular magnetizations simultaneously along corresponding successive legs of said first and said second sequence of flux legs comprising first advance circuit means including a first source of advance pulses connecting alternating first ones of said advance windings in series and second advance circuit means including a second source of advance pulses connecting alternating second ones of said advance windings in series.

7. A shift register circuit as claimed in claim 6 in which said first and said second advance circuit means serially connect said alternating first and second advance windings in a direction from the first leg to the last leg of one of said sequences of flux legs and from the last leg to the first leg of the other of said sequences of flux legs.

8. A shift register circuit as claimed in claim 6 also comprising output windings inductively coupled to particular ones of the legs of said first and said second sequence of flux legs energized responsive to the induction of flux in said coupled legs indicative of information bits.

9. A shift register circuit as claimed in claim 8 in which the legs of each of said first and said second sequence of flux legs are flux limited to the same flux magnitude.

10. An electrical control circuit comprising a magnetic plate of a material capable of assuming stable remanent flux conditions and having a first and a second sequence of apertures therein to define a first and a second sequence of corresponding flux legs, said first and said second sequence of apertures sharing a common first and a common last aperture, each of the flux legs of one of said sequences of flux legs having a remanent flux in one direction therein, said remanent flux being closed through a corresponding leg of the other of said sequences of flux legs in the opposite direction, an input winding threading said common first aperture, means including an input current pulse source for applying an input current pulse to said input winding to reverse the flux about said common first aperture representative of an information bit, an advance winding threading each of the other apertures of said first and said second sequence of apertures, advance means for shifting said information bit simultaneously along the corresponding legs of said first and said second sequence of flux legs comprising a first advance circuit including alternating first ones of said advance windings, a second advance circuit including alternating second ones of said advance windings, means including a first advance current pulse source for applying first phase advance current pulses to said first advance circuit to reverse the flux about alternating first ones of the apertures of said first and said second sequence of apertures, and means including a second advance current pulse source for applying second phase advance current pulses to said second advance circuit to reverse the flux about alternating second ones of the apertures of said first and said second sequence of apertures; and output windings threading particular ones of the apertures of said first and said second sequence of apertures energized responsive to flux reversals about said last mentioned apertures to generate output signals indicative of said information bit.

11. A shift register circuit comprising a first group of magnetic elements, a second group of magnetic elements corresponding respectively to the elements of said first group, each of the elements of said first and second groups being capable of assuming stable remanent states, magnetic means for completing flux paths between each of the elements of each of said groups and between each of the elements of one of said groups and a corresponding element of the other of said groups, information input means comprising a pulse source and an input winding inductively coupled to the first element of each of said first and said second group of elements, an advance winding inductively coupled to each adjacent pair of elements of said first and said second group of elements, a first phase advance circuit means including a first advance pulse source connecting alternating first ones of said advance windings in series, a second phase advance circuit means including a second advance pulse source connecting alternating second ones of said advance windings in series, and an output winding inductively coupled to at least one of the elements of said first and said second group of elements.

12. An electrical circuit comprising a magnetic plate having a plurality of substantially circularly disposed apertures therein to define a first and a second sequence of corresponding radially arranged flux legs, said legs being of a material capable of assuming stable magnetic flux states and presenting a plurality of flux-limited flux paths, an input winding threading the aperture defining the first flux leg of each of said first and said second sequence of flux legs, an advance winding threading each of the others of said apertures, a first circuit means for connecting alternating first ones of said advance windings in series in one direction about said apertures, a second circuit means for connecting alternating second ones of said advance windings in series in one direction about said apertures, and an output winding threading the aperture defining the last flux legs of each of said first and said second sequence of flux legs.

13. An electrical circuit as claimed in claim 12 in which said magnetic plate has additional apertures therein associated with said aforestated apertures for additionally defining said sequences of flux paths.

14. An electrical shift register circuit comprising a plurality of magnetic elements each having substantially rectangular hysteresis characteristics, an input winding inductively coupled to a first of said elements, input means including a pulse source for establishing a magnetic condition in said first element representative of an information value, an advance winding inductively coupled to each of said elements, means for successively shifting said magnetic condition along said plurality of magnetic elements comprising a first advance circuit including a first advance pulse source for connecting alternating first ones of said advance windings in series, a second advance circuit including a second advance pulse source for connecting alternating second ones of said advance windings in series, and magnetic means for completing magnetic flux paths between each element of said plurality of elements and its adjacent elements; and an output winding inductively coupled to a last element of said plurality of elements.

15. An electrical shift register circuit as claimed in claim 14 also comprising a parallel output winding inductively coupled to at least a selected one of said elements.

16. An electrical shift register circuit comprising a first and a second plurality of magnetic elements each having substantially rectangular hysteresis characteristics, an input winding inductively coupled to a first element of each of said first and second plurality of magnetic elements, input means including a pulse source for establishing a magnetic condition in each of said first elements representative of an information value, an advance winding inductively coupled to each element of said first and second plurality of elements, means for successively shifting said magnetic condition simultaneously along corresponding elements of each of said first and second plurality of magnetic elements comprising a first advance circuit including a first advance pulse source for connecting alternating first ones of said advance windings in series in one sequence with respect to said first plurality of elements and in the opposite sequence with respect to said second plurality of elements, a second advance circuit including a second advance pulse source for connecting alternating second ones of said advance windings in series also in said one sequence and said second sequence, and magnetic means for completing magnetic flux paths between each element of each of said first and second plurality of elements and its adjacent elements and between the corresponding elements of said first and said second plurality of elements; and an output winding inductively coupled to a last element of each of said first and said second plurality of elements.

17. An electrical shift register circuit as claimed in claim 16 also comprising parallel output windings inductively coupled to elements of said first and said second plurality of elements in predetermined combinations.

18. An electrical circuit as claimed in claim 1 further comprising a first source of advance current signals connected to said first advance circuit means, a second source of advance current signals connected to said second advance circuit means and timing means for alternately energizing said first and second sources.

References Cited in the file of this patent

UNITED STATES PATENTS

| | | |
|---|---|---|
| 2,680,819 | Booth | June 8, 1954 |
| 2,778,006 | Guterman | Jan. 15, 1957 |
| 2,818,555 | Lo | Dec. 31, 1957 |
| 2,889,542 | Goldner | June 2, 1959 |
| 2,902,678 | Kosonochy | Sept. 1, 1959 |
| 2,919,430 | Rajchman | Dec. 29, 1959 |
| 2,919,432 | Broadbent | Dec. 29, 1959 |
| 2,923,923 | Raker | Feb. 2, 1960 |
| 2,942,240 | Rajchman et al. | June 21, 1960 |
| 2,944,249 | Kuntzleman | July 5, 1960 |
| 2,952,840 | Ridler et al. | Sept. 13, 1960 |
| 2,957,163 | Kodis | Oct. 18, 1960 |

FOREIGN PATENTS

| | | |
|---|---|---|
| 1,042,033 | Germany | Oct. 30, 1958 |
| 814,455 | Great Britain | June 3, 1959 |
| 1,187,894 | France | Sept. 17, 1959 |

OTHER REFERENCES

Publication I: "Multihole Ferrite Core Configurations and Applications," H. W. Abbott and J. J. Suran, Proceedings of the I.R.E., vol. 45, No. 8, August 1957, pp. 1081–1093.

IBM Technical Disclosure Bulletin, "Magnetic Shift Registers," S. A. Butler, vol. 1, No. 6, April 1959, pp. 37–39.